US012558871B2

(12) United States Patent

Kim et al.

(10) Patent No.: US 12,558,871 B2

(45) Date of Patent: Feb. 24, 2026

(54) PROTECTIVE FILM MODULE AND METHOD FOR MANUFACTURING THE SAME

(71) Applicant: Samsung Display Co., LTD., Yongin-si (KR)

(72) Inventors: Kitaek Kim, Yongin-si (KR); Jiyoung Wang, Yongin-si (KR); Junghoon Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 226 days.

(21) Appl. No.: 18/355,503

(22) Filed: Jul. 20, 2023

(65) Prior Publication Data

US 2024/0109272 A1 Apr. 4, 2024

(51) Int. Cl.
B32B 7/12 (2006.01)
B32B 17/10 (2006.01)

(52) U.S. Cl.
CPC .......... B32B 7/12 (2013.01); B32B 17/10018 (2013.01); B32B 17/10862 (2013.01); B32B 2307/7376 (2023.05)

(58) Field of Classification Search
CPC ................ B32B 7/12; B32B 17/10018; B32B 17/10862; B32B 2307/7376; B32B 2307/306; B32B 2307/558; B32B 2307/748; B32B 17/10; B32B 27/08; B32B 27/36; B32B 2457/20; B32B 3/06; B32B 17/10027; B32B 37/0076; B32B 2037/0092; B32B 2309/10
See application file for complete search history.

(56) References Cited

U.S. PATENT DOCUMENTS

| | | | |
|---|---|---|---|
| 10,399,298 B2 | 9/2019 | Yee | |
| 10,665,816 B2 | 5/2020 | Oh et al. | |
| 2020/0099010 A1 | 3/2020 | Park et al. | |
| 2021/0291494 A1* | 9/2021 | Alderman ................. B32B 7/12 | |
| 2023/0199989 A1* | 6/2023 | Yee .......................... B32B 37/12 | |
| | | | 156/249 |
| 2024/0103202 A1* | 3/2024 | Kim ...................... G06F 1/1652 | |

FOREIGN PATENT DOCUMENTS

| | | |
|---|---|---|
| JP | 2022-77500 | 5/2022 |
| KR | 10-2020-0033366 | 3/2020 |
| KR | 10-2020-0034862 | 4/2020 |
| KR | 10-2403879 | 5/2022 |

* cited by examiner

*Primary Examiner* — Michael Zhang
(74) *Attorney, Agent, or Firm* — Sughrue Mion, PLLC

(57) ABSTRACT

A protective film module includes a first film protecting a first face of a thin-film glass, a first adhesive layer disposed between the thin-film glass and the first film and contacting the first face of the thin-film glass, a second film disposed on the first adhesive layer, and covering the thin-film glass, and having a closed line shape in a plan view of the protective film module, a third film protecting a second face opposite to the first face of the thin-film glass, and a second adhesive layer disposed between the thin-film glass and the third film and in contact with the second film, wherein the thin-film glass is disposed in an inner space defined between the second film, the first adhesive layer, and the second adhesive layer.

16 Claims, 12 Drawing Sheets

PROTECTIVE FILM MODULE AND METHOD FOR MANUFACTURING THE SAME

CROSS-REFERENCE TO RELATED APPLICATIONS

This application claims priority to and benefits of Korean Patent Application No. 10-2022-0124415 under 35 U.S.C. § 119, filed in the Korean Intellectual Property Office on Sep. 29, 2022, the entire contents of which are incorporated herein by reference.

BACKGROUND

1. Technical Field

Embodiments of the disclosure described herein relate to a protective film module and a method for manufacturing the same, which is capable of preventing damage of a thin-film glass.

2. Description of the Related Art

Various display devices used in multimedia devices such as televisions, mobile phones, tablet computers, navigation devices, and game consoles are being developed. In particular, recently, a display device having a flexible display member, and thus capable of folding or rolling in order to facilitate portability and improve user convenience is being developed.

In the display device that can be folded or rolled, UTG (Ultra Thin Glass) as an ultra-thin tempered glass may be used to enable the folding or rolling. The UTG has a thickness smaller than 100 in and thus is very thin, and thus can be folded flexibly and has characteristics of a glass material that is resistant to scratches.

It is to be understood that this background of the technology section is, in part, intended to provide useful background for understanding the technology. However, this background of the technology section may also include ideas, concepts, or recognitions that were not part of what was appreciated by those skilled in the pertinent art prior to a corresponding effective filing date of the subject matter disclosed herein.

SUMMARY

Embodiments provide a protective film module capable of preventing damage of a thin-film glass.

Embodiments also provide a method for manufacturing a protective film module, which is capable of preventing damage of a thin-film glass.

However, embodiments of the disclosure are not limited to those set forth herein. The above and other embodiments will become more apparent to one of ordinary skill in the art to which the disclosure pertains by referencing the detailed description of the disclosure given below.

According to an embodiment, a protective film module includes a first film protecting a first face of a thin-film glass, a first adhesive layer disposed between the thin-film glass and the first film and contacting the first face of the thin-film glass, a second film disposed on the first adhesive layer, and covering the thin-film glass, and having a closed line shape in a plan view of the protective film module, a third film protecting a second face opposite to the first face of the thin-film glass, and a second adhesive layer disposed between the thin-film glass and the third film and in contact with the second film, wherein the thin-film glass is disposed in an inner space defined between the second film, the first adhesive layer, and the second adhesive layer.

A thickness of the second film may be in a range of about 1.3 to about 1.7 times of a thickness of the thin-film glass.

A side face of the thin-film glass may be spaced, by a distance, from an inner side face of the second film adjacent to the side face of the thin-film glass.

The first adhesive layer may be in contact with the first film.

Corresponding side faces of the first film, the first adhesive layer, and the second film may be aligned with each other.

An outer side face of the second film may protrude outwardly beyond an outer side face of the second adhesive layer.

The second face of the thin-film glass may be spaced apart from the second adhesive layer by a distance.

Corresponding side faces of the second adhesive layer and the third film may be aligned with each other.

A face of the second adhesive layer facing the second face of the thin-film glass may be adhered only to a face of the second film adjacent to the second adhesive layer.

The second film may be detachably bonded to the second adhesive layer.

The protective film module may further include at least one pad disposed between the second adhesive layer and the thin-film glass and having a thickness smaller than a minimum distance between the second face of the thin-film glass and the second adhesive layer.

According to an embodiment, a protective film module includes a base film protecting a first face of a thin-film glass and including a first base film portion, and a second base film portion protruding from the first base film portion in a thickness direction of the first base film portion, a film protecting a second face opposite to the first face of the thin-film glass, and an adhesive layer disposed between the thin-film glass and the film and in contact with the second face of the thin-film glass. The second base film portion has a closed line shape in a plan view. The thin-film glass is disposed in an inner space defined between the base film and the adhesive layer.

The second base film portion and the thin-film glass may have a substantially same thickness.

The first base film portion and the thin-film glass may extend in a same direction, and the first base film portion may contact the first face of the thin-film glass.

An outer side face of the second base film portion may protrude outwardly beyond an outer side face of the adhesive layer.

According to an embodiment, a method for manufacturing a protective film module includes bonding a first adhesive layer onto a first film, bonding a second film to an outer portion of the first adhesive layer, detachably bonding a thin-film glass onto the first adhesive layer, bonding a second adhesive layer onto the second film, bonding a third film onto the second adhesive layer, and pressing the third film with a roller. The first film protects a first face of the thin-film glass. The first adhesive layer is disposed between the thin-film glass and the first film and contacts the first face of the thin-film glass. The second film is disposed on the first adhesive layer, surrounds the thin-film glass, and has a closed line shape in a plan view. The third film protects a second face opposite to the first face of the thin-film glass. The second adhesive layer is disposed between the thin-film glass and the third film. The thin-film glass is disposed in an inner space defined between the second film, the first adhesive layer, and the second adhesive layer.

In case that the third film is pressed with the roller, a pressure of the roller may be transmitted to the first adhesive layer, the second adhesive layer, the first film, and the second film through a pressing area of the third film overlapping the second film in a plan view.

In case that the third film is pressed with the roller, the second film may be compressed. A thickness of the compressed second film may be greater than a thickness of the thin-film glass.

In the pressing of the third film with the roller, the second face of the thin-film glass may be spaced apart from the second adhesive layer.

A thickness of the second film may be in a range of about 1.3 to about 1.7 times of a thickness of the thin-film glass.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
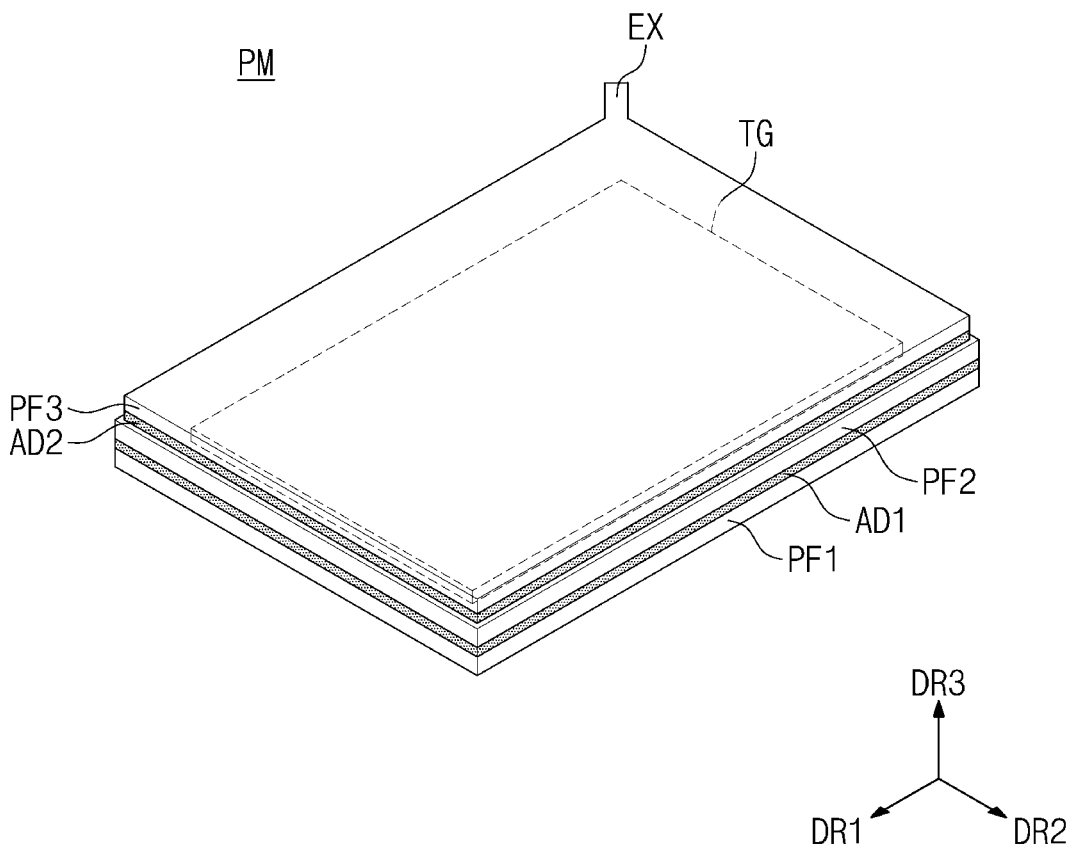
FIG. 1 is a schematic perspective view of a protective film module according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure.

Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like components.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

The words "in a plan view" as used herein may mean "when viewed in the third direction DR3" throughout the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, a protective film module PM according to an embodiment of the disclosure is described below with reference to drawings.

FIG. 1 is a schematic perspective view of the protective film module PM according to an embodiment of the disclosure.

Referring to FIG. 1, the protective film module PM may include a first film PF1, a first adhesive layer AD1, a second film PF2, a second adhesive layer AD2, and a third film PF3. The protective film module PM may seal the thin-film glass TG. The protective film module PM may protect the thin-film glass TG from external impact and prevent foreign materials from entering (or contaminating) the thin-film glass TG. In the disclosure, those of ordinary skill in the art related to the embodiment may understand that other elements other than the elements as shown in FIG. 1 may be further included in the protective film module PM.

The thin-film glass TG protected by the protective film module PM may be used as a window for large-sized display devices such as televisions and monitors. For example, the protective film module PM may also protect the thin-film glass TG for medium-sized display devices such as smartphones, tablets, car navigation systems, and game consoles. The thin-film glass TG may be embodied as (or be implemented with) UTG (ultra thin glass) and may be an element used as a display cover window.

A thickness of the thin-film glass TG may be about 100 μm or smaller. Thus, the thin-film glass TG may be very thin and may be flexibly folded. Thus, the thin-film glass TG may be used as a window for a foldable, rollable, or slidable display. The thin-film glass TG may transmit an image displayed on a screen of the display to an outside without change or deformation, and the thin-film glass TG may have high transparency and scratch resistance. Thus, the thin-film glass TG may be made of a material with high durability. However, a shape and the material of the thin-film glass TG are not limited thereto and may have various shapes and materials.

Figure 2:
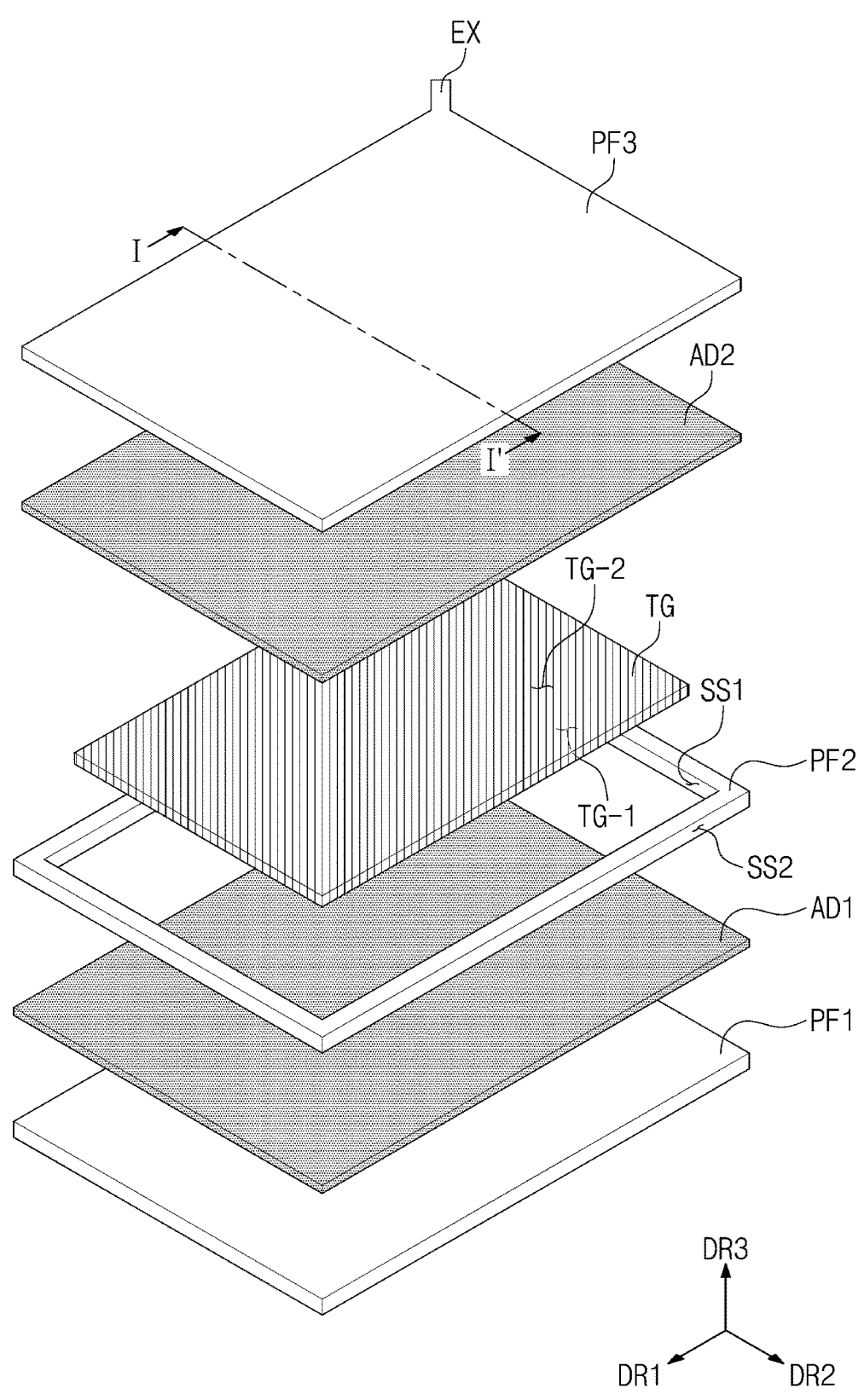
FIG. 2 is a schematic exploded perspective view of a protective film module according to an embodiment of the disclosure.
Figure 3:
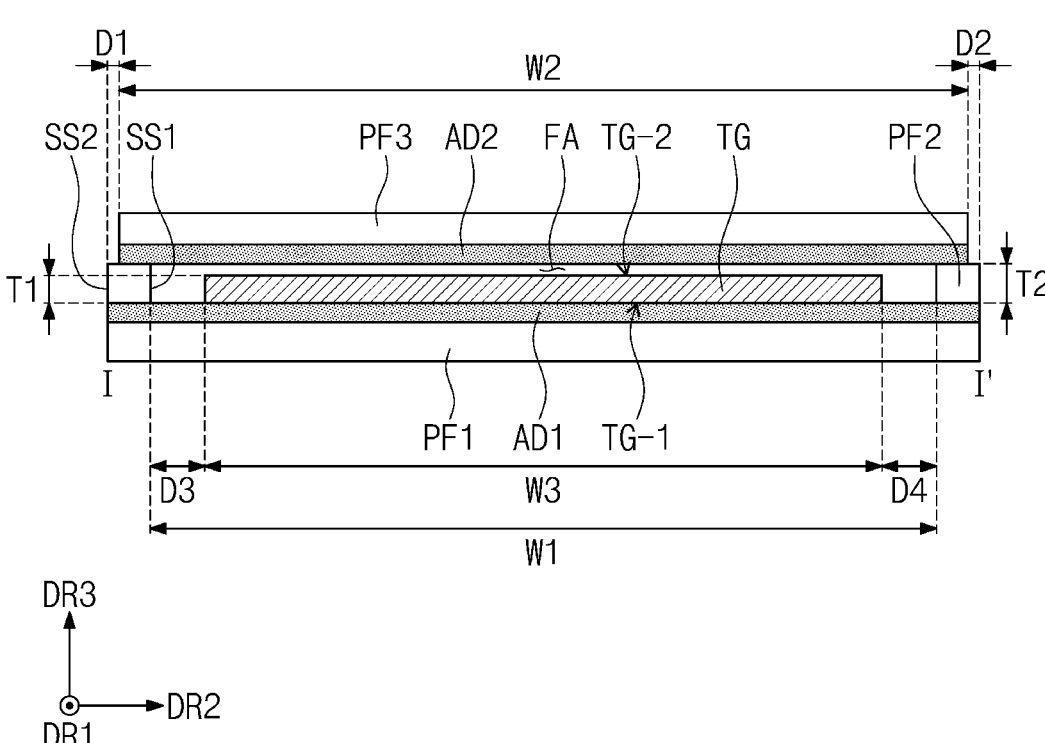
FIG. 3 is a schematic cross-sectional view taken along line I-I' of FIG. 2.

FIG. 2 is a schematic exploded perspective view of the protective film module PM according to an embodiment of the disclosure, and FIG. 3 is a schematic cross-sectional view taken along line I-I' of FIG. 2.

Referring to FIGS. 2 and 3, the first film PF1 may protect a first face TG-1 of the thin-film glass TG. The first film PF1 may protect the thin-film glass TG before assembly (e.g., before assembly with a device or a display panel) and may be separated from the thin-film glass TG in case that the thin-film glass TG is assembled with the device. For example, the first film PF1 may be peeled off, and the thin-film glass TG may be assembled with the device.

The first film PF1 may have an area sufficient to cover the first face TG-1 of the thin-film glass TG. For example, the first film PF1 may be greater than the first face TG-1 of the thin-film glass TG in a plan view. The first film PF1 may extend in a direction parallel to a plane defined by a first direction DR1 and a second direction DR2.

The first film PF1 may have a plane parallel to the first face TG-1 of the thin-film glass TG. The first film PF1 may act as an outermost part of the protective film module PM. The first film PF1 may prevent the thin-film glass TG from being damaged by external impact or prevent a foreign material from being introduced into the thin-film glass TG. Thus, the first film PF1 may prevent deterioration of the quality of the thin-film glass TG.

The first film PF1 may be disposed on the first adhesive layer AD1. The first film PF1 and the first adhesive layer AD1 may have a same planar area size. The first film PF1 may be adhered to the first face TG-1 of the thin-film glass TG via the first adhesive layer AD1.

The first film PF1 may be embodied as (or implemented with) a polyethylene terephthalate (PET) film having sufficient impact resistance and heat resistance to protect the thin-film glass TG. However, the material of the first film PF1 is not limited thereto, and various materials may be used as the material of the first film PF1.

The first adhesive layer AD1 may be disposed between the thin-film glass TG and the first film PF1 and may contact the first face TG-1 of the thin-film glass TG. The first adhesive layer AD1 may provide an adhesive force, and the first film PF1 may be fixed on the first face TG-1 of the thin-film glass TG. The first adhesive layer AD1 may provide an adhesive force, and the second film PF2 may be fixed to the first adhesive layer AD1. In an embodiment, the first adhesive layer AD1 may be detachably attached to the thin-film glass TG and may be separated from the thin-film glass TG in a subsequent process.

The first adhesive layer AD1 may contact the first film PF1. The first adhesive layer AD1 and the first film PF1 may constitute two layers. The first adhesive layer AD1, the first film PF1, and an existing protective film for protecting the thin-film glass TG may have a same structure. The existing protective film for protecting the thin-film glass TG may be utilized as the first adhesive layer AD1 and the first film PF1.

The first adhesive layer AD1 may include a pressure sensitive adhesive (PSA) film. However, the first adhesive layer AD1 is not limited thereto, and may include an adhesive or glue. A thickness of the first adhesive layer AD1 may be in a range of about 10 μm to about 50 μm. For example, the thickness may be in a range of 25 about μm to about 35 μm.

The second film PF2 may be disposed on the first adhesive layer AD1 and surround the thin-film glass TG. The second film PF2 may have a closed line shape in a plan view. The second film PF2 may be disposed along an edge of a top face of the first adhesive layer AD1 and may have an annular shape (e.g., a rectangular loop shape) having an inner side face SS1 and an outer side face SS2. The second film PF2 may protect the thin-film glass TG before assembly (e.g., before the assembly with the device or the display panel) and may be separated from the thin-film glass TG in case that the thin-film glass TG is assembled with the device.

The second film PF2 may protrude in a third direction DR3 beyond a second face TG-2 of the thin-film glass TG and prevent the second adhesive layer AD2 from touching (or contacting) the second face TG-2 of the thin-film glass TG. The second adhesive layer AD2 may be bonded to a top face of the second film PF2, and the first adhesive layer AD1 may be bonded to a bottom face of the second film PF2. Thus, a side face of the thin-film glass TG may be sealed. The second film PF2 may prevent external contaminants from entering the side face and/or the second face TG-2 of the thin-film glass TG.

The outer side face SS2 of the second film PF2 may be aligned with a side face (e.g., a corresponding side face) of each of the first film PF1 and the first adhesive layer AD1. For example, side faces (e.g., corresponding side faces) of the first film PF1, the first adhesive layer AD1, and the second film PF2 may be aligned with each other in a straight line in a cross-sectional view. Accordingly, one of the side faces (e.g., corresponding side faces) of the first film PF1, the first adhesive layer AD1, and the second film PF2 may not protrude beyond the remaining ones thereof, and an external shock may be distributed across the side faces of the first film PF1, the first adhesive layer AD1, and the second film PF2.

A step may not be formed (or may not occur) between the side faces of the first film PF1, the first adhesive layer AD1 and the second film PF2, and the first film PF1, the first adhesive layer AD1, and the second film PF2 may not be peeled off or be removed off. Accordingly, contamination of the internal thin-film glass TG with an external foreign material may be reduced (or prevented).

The inner side face SS1 of the second film PF2 may be spaced apart from a side face of the thin-film glass TG adjacent thereto by a distance (e.g., a certain or selectable distance). Accordingly, the side face of the thin-film glass TG may be isolated from an external environment. For example, the thin-film glass TG may be spaced apart from the inner side face SS1 of the second film PF2. Thus, an external shock may not be transmitted to the thin-film glass TG.

As shown in FIG. 3, opposing side faces SS1 (e.g., opposing inner side faces SS1) of the second film PF2 may be respectively spaced, by distances D3 and D4, from the side faces of the thin-film glass TG. For example, an inner side face SS1 of the second film PF2 may be spaced apart from a side face of the thin-film glass TG, and another inner side face SS1 of the second film PF2 may be spaced apart from another side face of the thin-film glass TG. The distances D3 and D4 by which the opposing inner side faces SS1 of the second film PF2 may be respectively spaced from the side face of the thin-film glass TG may be equal to each other. Thus, a side face of the thin-film glass TG may be prevented from touching (or contacting) the second film PF2 or colliding therewith to be damaged due to an external impact. A width W1 between the inner side faces SS1 (e.g., opposing inner side faces SS1) of the second film PF2 may be greater than a width W3 of the thin-film glass TG.

A thickness T2 of the second film PF2 may be in a range of about 1.3 to about 1.7 times of a thickness T1 of the thin-film glass TG. This (e.g., the relationship between the thicknesses T1 and T2) may be intended such that the thickness T2 of the second film PF2 is larger than the thickness T1 of the thin-film glass TG in case that the second film PF2 is compressed with a roller RR (e.g., refer to FIG. 12) because the thickness T2 of the second film PF2 may be in a range of about 0.7 to about 0.8 times of that of the second film PF2 before the compressing in case that the second film PF2 has been compressed with the roller. For example, a compressed thickness of the second film PF2 may be in a range of about 0.7 to about 0.8 times of an uncompressed thickness of the second film PF2. Thus, in case that the thickness T2 of the second film PR2 is in a range of about 1.3 to about 1.7 times of the thickness T1 of the thin-film glass TG, the compressed thickness (e.g., a thickness compressed from the thickness T2) of the second film PF2 may be greater than the thickness T2 of the thin-film glass TG. The second film PF2 may be compressed in case that the second film PF2 is pressed with the roller RR, and the second adhesive layer AD2 and the third film PF3 may be bonded to the top face of the compressed second film PF2 (e.g., refer to FIG. 12).

In case that the thickness T2 of the second film PF2 is smaller than about 1.3 times of the thickness T1 of the thin-film glass TG, the second film PF2 may be compressed with the roller and the second adhesive layer AD2 and the second face TG-2 of the thin-film glass TG may contact each other. Accordingly, a pressure of the roller RR may be transmitted to the thin-film glass TG. In case that the thickness T2 of the second film PF2 exceeds about 1.7 times of the thickness T1 of the thin-film glass TG, a pressure of the roller RR may be applied to the flexible second film PF2. Thus, buckling load may be applied (or occur), and the protective film module PM may occupy a space size larger than a required space size. For example, the space occupied by the protective film module PM may be increased because of the buckling of the second film FM2 in case that the thickness T2 of the second film PF2 exceeds about 1.7 times of the thickness T1 of the thin-film glass TG.

The first film PF1 and the second film PF2 may be made of a same material. The second film PF2 may be embodied as (or implemented with) a polyethylene terephthalate (PET) film having sufficient impact resistance and heat resistance to protect the thin-film glass TG. However, the material of the second film PF2 is not limited thereto, and various materials may be used as the material of the second film PF2.

The outer side face SS2 of the second film PF2 may protrude outwardly beyond an outer side face of the second adhesive layer AD2 adjacent thereto. This (e.g., the protruded structure of the second film PF2) may prevent an adhesive residue that may be generated by an external impact applied to the side face of the second adhesive layer AD2 and interrupt (e.g., hinder or disturb) the separation of the second adhesive layer AD2 and the third film PF3. The adhesive residue means that a portion of a deformed second adhesive layer AD2 invades the second film PF2 and the third film PF3 adjacent thereto.

Lengths D1 and D2 by which the outer side faces SS2 (e.g., opposing outer side faces SS2) of the second film PF2 respectively protrude outwardly beyond the outer side faces of the second adhesive layer AD2 adjacent thereto may be the same as each other. Accordingly, the outer side faces (e.g., the opposing outer side faces) of the second adhesive layer AD2 may be located inwardly from the outer side faces SS2 of the second film PF2. For example, an outer side face of the second adhesive layer AD2 may be spaced apart from an outer side face SS2 of the second film PF2, and another outer side face of the second adhesive layer AD2 may be spaced apart from another outer side face SS2 of the second film PF2. The outer side faces of the second adhesive layer AD2 may be spaced, by a same spacing, from the outer side face SS2 of the second film PF2. For example, Thus, one of the outer side faces (e.g., the opposing outer side faces) of the second adhesive layer AD2 may be prevented from being exposed to external impact. Further, a contact area size of the second film PF2 with the second adhesive layer AD2 and a contact area size of the second adhesive layer AD2 with the second film PF2 may be equal to each other, such that uniform adhesion may be achieved.

The second adhesive layer AD2 may be disposed between the thin-film glass TG and the third film PF3 and may contact the second film PF2. An outer portion of the second adhesive layer AD2 may be disposed on the top face of the second film PF2 and may contact the second film PF2. A central portion of the second adhesive layer AD2 may be disposed between the thin-film glass TG and the third film PF3. A bottom face of the second adhesive layer AD2 may be spaced apart from the second face TG-2 of the thin-film glass TG in the third direction DR3 by a distance (e.g., a predetermined or selectable distance). For example, the central portion of the second adhesive layer AD2 may be spaced apart from the second face TG-2 of the thin-film glass TG in the third direction DR3. Thus, a pressure may not be applied to the thin-film glass TG during the compression using the roller RR (e.g., refer to FIG. 12).

A face (e.g., the bottom face) of the second adhesive layer AD2 facing the second face TG-2 of the thin-film glass TG may be adhered only to a face of the second film PF2 adjacent thereto. For example, the bottom face (e.g., a peripheral portion of the bottom face) of the second adhesive layer AD2 may be adhered only to a top face of the second film PF2 and may not be adhered to the second face TG-2 of the thin-film glass TG or the top face of the first adhesive layer AD1. Accordingly, transfer (or pollution) of an adhesive material of the second adhesive layer AD2 to the side face or the top face of the thin-film glass TG may be prevented. For example, the thin-film glass TG may not be polluted by the adhesive material of the second adhesive layer AD2. Thus, the second adhesive layer AD2 may not stick to (or may not be peeled off from) the first adhesive layer AD1 and the thin-film glass TG.

The third film PF3 and the second adhesive layer AD2 may be separated from the second film PF2 in case that the thin-film glass TG is assembled (or combined) with the device. The second adhesive layer AD2 may be detachably bonded to the second film PF2.

A width W2 of the second adhesive layer AD2 may be greater than a width W3 of the thin-film glass TG, and the second adhesive layer AD2 may cover the second face TG-2 of the thin-film glass TG. The second adhesive layer AD2 may be supported, at ends (e.g., opposing ends) thereof, by the second film PF2. Thus, the width W2 of the second adhesive layer AD2 may be greater than the width W1 between the inner side faces SS1 (e.g., the opposing inner side faces SS1) of the second film PF2 in a direction (e.g., the second direction DR2) of the width W2 of the second adhesive layer AD2. Side faces (e.g., corresponding side faces) of the second adhesive layer AD2 and the third film PF3 may be aligned with each other in a straight line in a cross-sectional view. This (e.g., the relationship between the widths W1, W2, and W3) may prevent the third film PF3 from being peeled off from the second adhesive layer AD2 or a foreign material from being introduced thereto due to a step between the second adhesive layer AD2 and the third film PF3.

The thin-film glass TG may be disposed (e.g., accommodated) in an inner space FA defined between the inner side faces SS1 (e.g., the opposing inner side faces SS1) of the second film PF2, the top face of the first adhesive layer AD1, and the bottom face of the second adhesive layer AD2. The inner side faces SS1 (e.g., the opposing inner side faces SS1) of the second film PF2, the top face of the first adhesive layer AD1, and the bottom face of the second adhesive layer AD2 may be tightly sealed to block inflow of external material into the thin-film glass TG.

The third film PF3 may protect the second face TG-2 opposite to the first face TG-1 of the thin-film glass TG. The third film PF3 may have an area sufficient to cover the second face TG-2 of the thin-film glass TG. For example, the third film PF3 may be greater than the second face TG-2 of the thin-film glass TG in a plan view. The third film PF3 may extend in the direction parallel to the plane defined by the first direction DR1 and the second direction DR2.

The third film PF3 may have a planar shape parallel to the second face TG-2 of the thin-film glass TG. The third film PF3 may act as a top portion of the protective film module PM. The third film PF3 may prevent the thin-film glass TG from being damaged by external impact or prevent the foreign material from flowing into the thin-film glass TG. Thus, the third film PF3 may prevent deterioration of the quality of the thin-film glass TG.

The third film PF3 may be disposed on the second adhesive layer AD2. The third film PF3 and the second adhesive layer AD2 may have a same planar area size. A protrusion EX for facilitating peeling (e.g., peeling of the third film PF3) may be formed at a corner of the third film PF3. However, the protrusion EX may be omitted.

The third film PF3 may be embodied as (or implemented with) a polyethylene terephthalate (PET) film having sufficient impact resistance and heat resistance to protect the thin-film glass TG. However, the material of the third film PF3 is not limited thereto, and various materials may be used as the material of the third film PF3.

Figure 4:
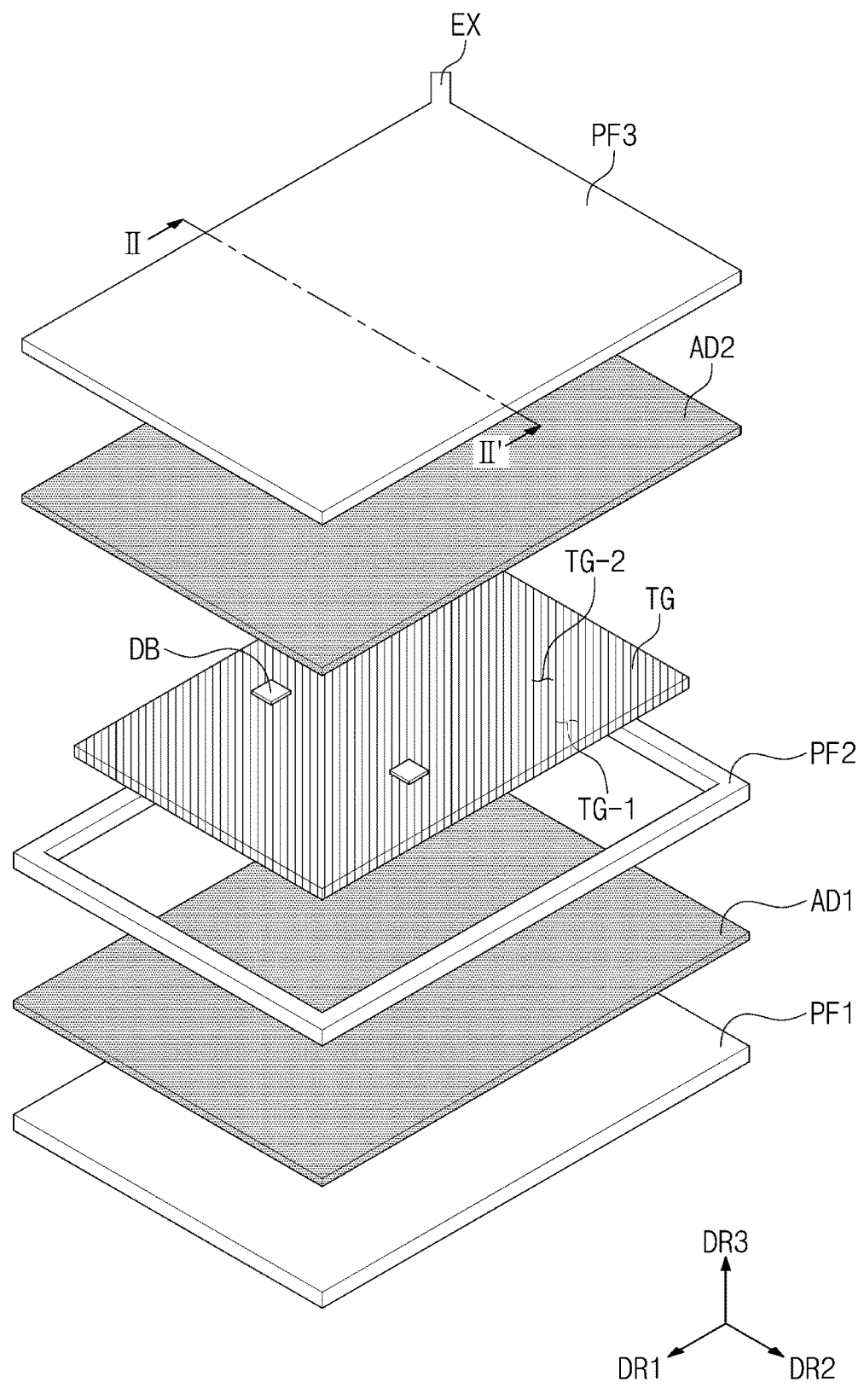
FIG. 4 is a schematic exploded perspective view of a protective film module according to an embodiment of the disclosure.
Figure 5:
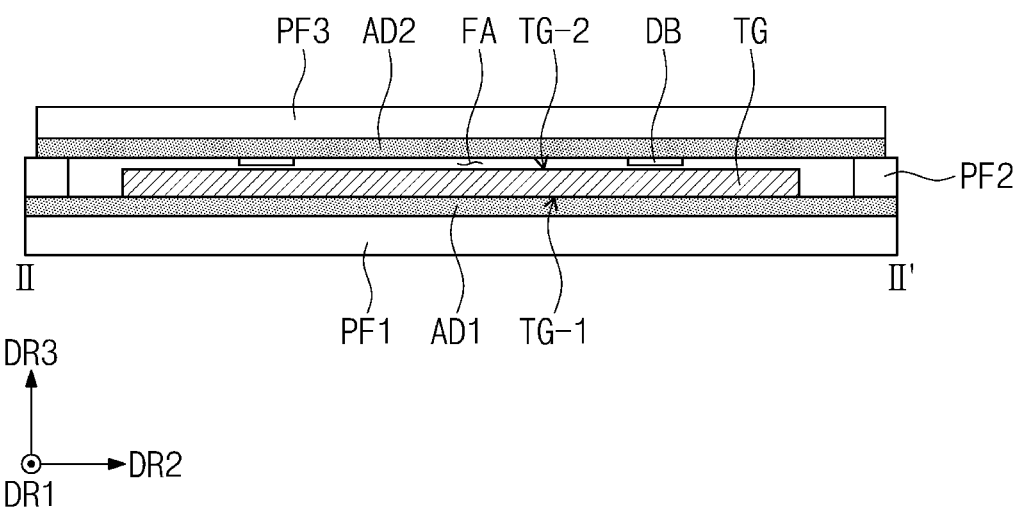
FIG. 5 is a schematic cross-sectional view taken along line II-II' of FIG. 4.

FIG. 4 is a schematic exploded perspective view of the protective film module PM according to an embodiment of the disclosure, and FIG. 5 is a schematic cross-sectional view taken along line II-II' of FIG. 4.

Referring to FIGS. 4 and 5, the protective film module PM of FIGS. 4 and 5 is different from the protective film module PM of FIGS. 1 to 3 at least in that pads DB are disposed between the second adhesive layer AD2 and the thin-film glass TG. Thus, detailed descriptions of the same constituent elements are omitted and the same reference numerals are used for the same elements.

At least one pad DB may be disposed between the second adhesive layer AD2 and the thin-film glass TG. In FIGS. 4 and 5, multiple pads DB may be arranged symmetrically with respect to a center (or a central line) of the thin-film glass TG.

A thickness of each of the pads DB may be smaller than a minimum distance between the second face TG-2 of the thin-film glass TG and the second adhesive layer AD2. In case that a pressure is applied to the second adhesive layer AD2, the pads DB may be adhered to the second adhesive layer AD2. In case that a pressure is not applied to the second adhesive layer AD2, the pads DB may be spaced, by a distance (e.g., a predetermined distance), from the second face TG-2 of the thin-film glass TG. For example, in case that the pressure is not applied, the pads DB may be spaced apart from the second face TG-2 of the thin-film glass TG.

Figure 12:
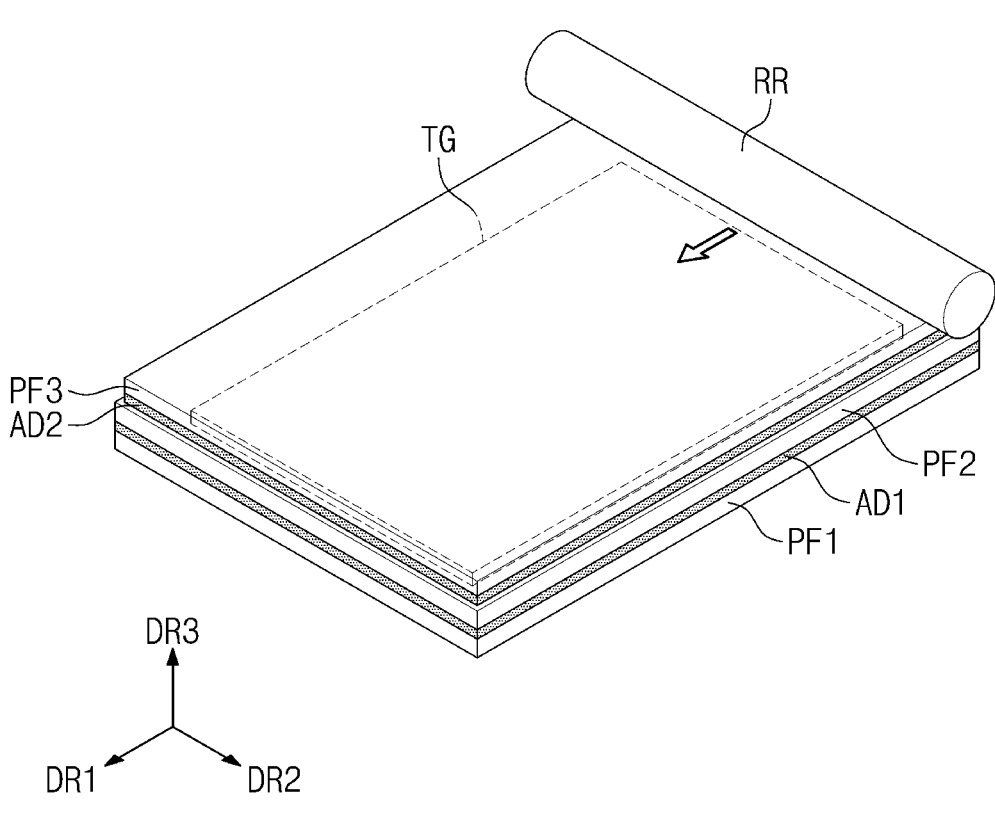

The pads DB may prevent the second adhesive layer AD2 from touching (or contacting) the second face TG-2 of the thin-film glass TG during compressing using the roller RR (e.g., refer to FIG. 12). The pads DB may be made of a porous material such as foamed plastic or sponge, or a material such as rubber with excellent elasticity. Thus, in case that the pressure of the roller RR is applied to the thin-film glass TG, the pads may alleviate an impact and prevent damage of the thin-film glass TG.

Figure 6:
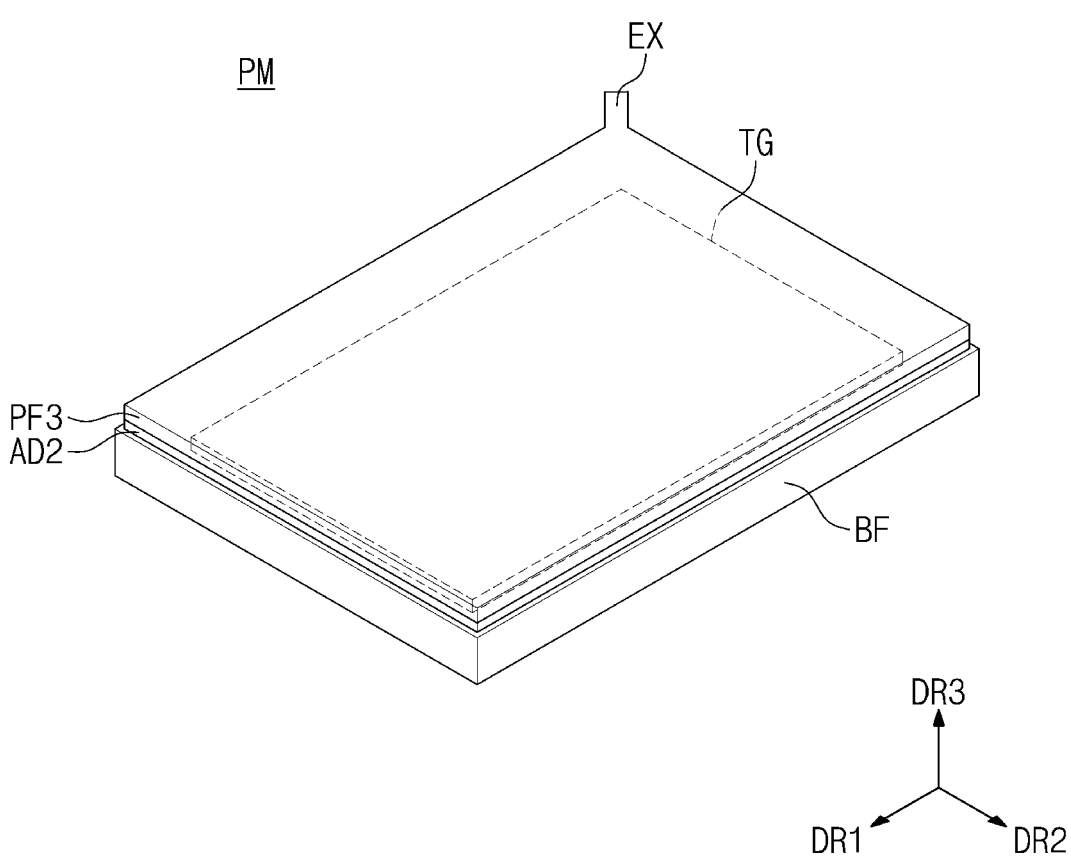
FIG. 6 is a schematic perspective view of a protective film module according to an embodiment of the disclosure.

FIG. 6 is a schematic perspective view of the protective film module PM according to an embodiment of the disclosure.

Referring to FIG. 6, the protective film module PM of FIG. 6 is different from the protective film module PM of FIGS. 1 to 3 at least in that the second adhesive layer AD2 is arranged on a base film BF. Thus, detailed descriptions of the same constituent elements are omitted. Like reference numerals are used for like elements.

Referring to FIG. 6, the protective film module PM may include the base film BF, the second adhesive layer AD2, and the third film PF3.

Figure 7:
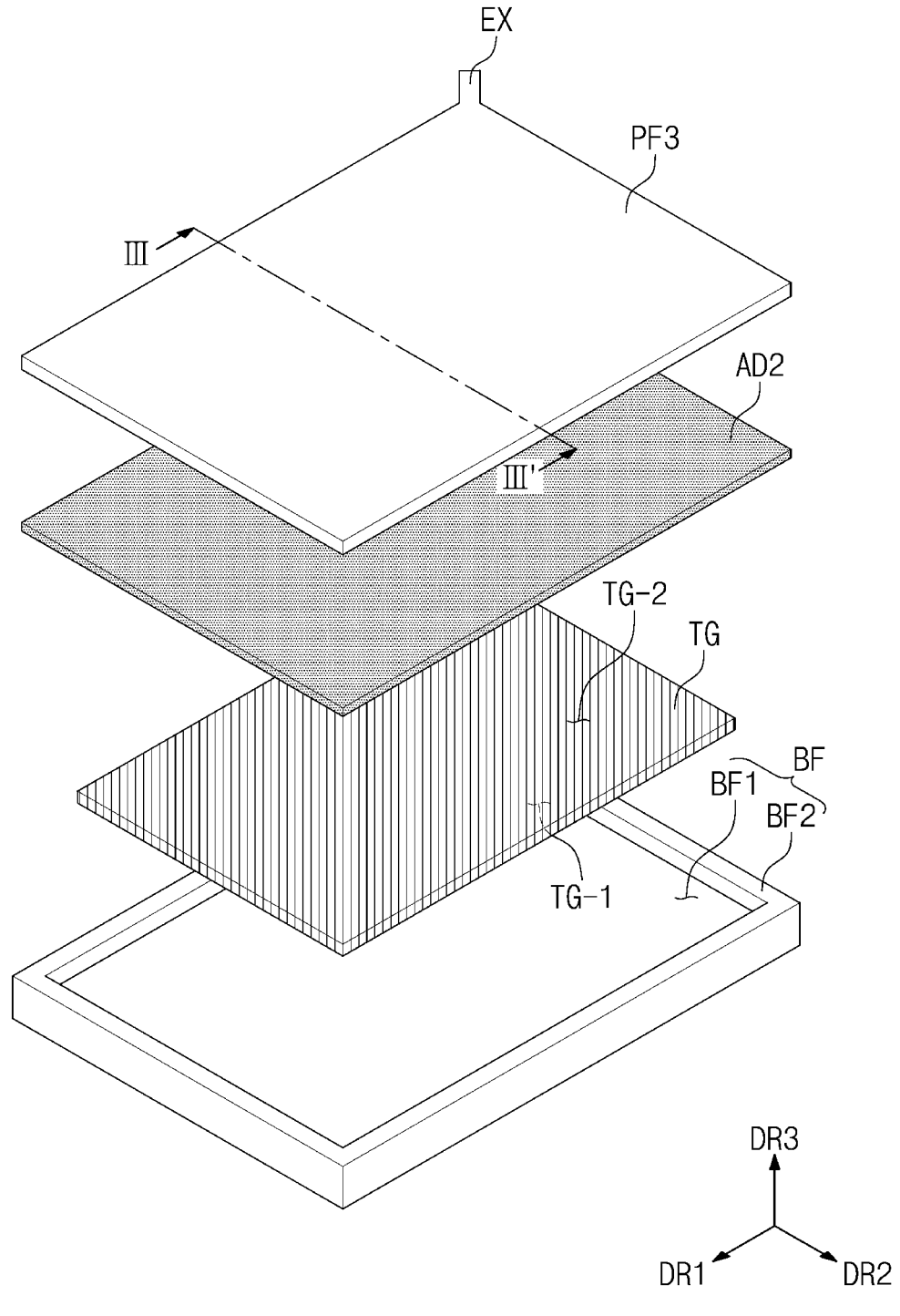
FIG. 7 is a schematic exploded perspective view of a protective film module according to an embodiment of the disclosure.
Figure 8:
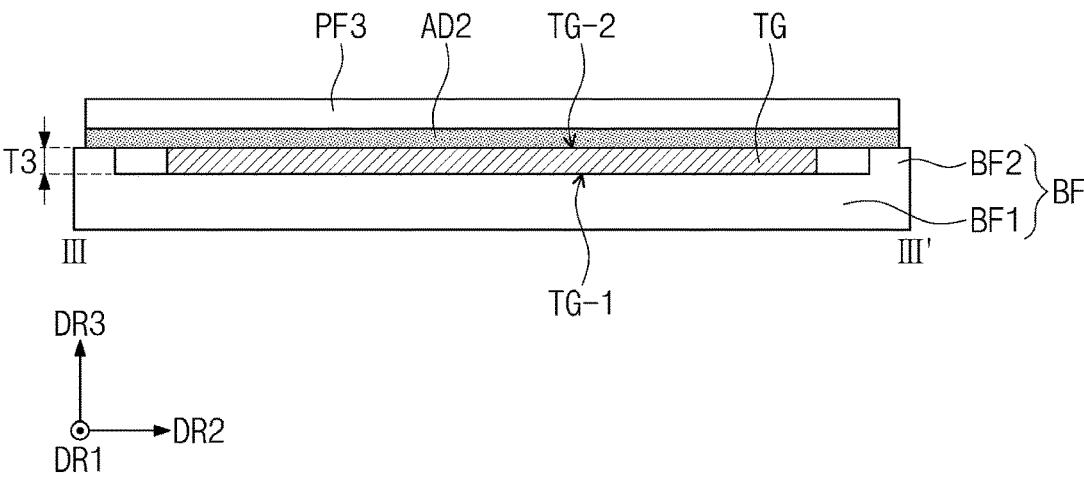
FIG. 8 is a schematic cross-sectional view taken along line III-III' of FIG. 7.

FIG. 7 is a schematic exploded perspective view of the protective film module PM according to an embodiment of the disclosure, and FIG. 8 is a schematic cross-sectional view taken along line III-III' of FIG. 7.

Referring to FIGS. 7 and 8, the base film BF may include a first base film portion BF1 and a second base film portion BF2. The base film BF may be disposed under the thin-film glass TG and protect the first face TG-1 and the side face of the thin-film glass TG. The base film BF may be peeled off from the thin-film glass TG in case that the thin-film glass TG is assembled with the device.

The first base film portion BF1 may extend in a direction in which the thin-film glass TG extends. For example, the first base film portion BF1 may extend in a direction parallel to the plane defined by the first direction DR1 and the second direction DR2. The first base film portion BF1 may have an area size sufficient to surround (or cover) the first face TG-1 of the thin-film glass TG. For example, the first base film portion BF1 may be greater than the first face TG-1 of the thin-film glass TG in a plan view. The first base film portion BF1 may protect the first face TG-1 of the thin-film glass TG.

A top face of the first base film portion BF1 may contact the first face TG-1 of the thin-film glass TG. Since a separate adhesive layer may not be disposed between the top face of the first base film portion BF1 and the first face TG-1 of the thin-film glass TG, an adhesive material may be prevented from being transferred to the first face TG-1 of the thin-film glass TG. Thus, in case that the thin-film glass TG is assembled with the device, a plasma process for removing a contaminating material of the first face TG-1 may not be required.

The first base film portion BF1 may be embodied as (or implemented with) a polyethylene terephthalate (PET) film having sufficient impact resistance and heat resistance to protect the thin-film glass TG. However, the material of the first base film portion BF1 is not limited thereto and various materials may be used as the material of the first base film portion BF1.

The second base film portion BF2 may protrude in a thickness direction (e.g., the third direction DR3) of the first base film portion BF1 and may have a closed line shape (e.g., a rectangular frame shape) in a plan view. The second base film portion BF2 may be disposed along an edge of the first base film portion BF1 and may have an annular shape (e.g., a rectangular loop shape) having an inner side face and an outer side face.

A thickness T3 of the second base film portion BF2 may be substantially the same as a thickness of the thin-film glass TG. The phrase "being substantially the same" may mean being the same except for a small error that is meaningless. The thickness T3 of the second base film portion BF2 and the thickness of the thin-film glass TG may be substantially the same as each other, and the second face TG-2 of the thin-film glass TG may be bonded to the bottom face of the second adhesive layer AD2.

An outer side face of the second base film portion BF2 may protrude outwardly beyond an outer side face of the second adhesive layer AD2. This (e.g., the protruded outer side face of the second base film portion BF2) may prevent an external impact from being applied to the outer side face of the second adhesive layer AD2. Thus, the adhesive material of the second adhesive layer AD2 may not invade the third film PF3 and the second base film portion BF2.

The second adhesive layer AD2 may be disposed between the thin-film glass TG and the third film PF3 and may contact the second face TG-2 of the thin-film glass TG. The second adhesive layer AD2 may be detachably adhered to the second face TG-2 of the thin-film glass TG.

The third film PF3 may protect the second face TG-2 of the thin-film glass TG.

The thin-film glass TG may be disposed (e.g., accommodated) in an inner space defined between the base film BF and the second adhesive layer AD2. The inner space defined by the base film BF and the second adhesive layer AD2 may be sealed with the base film BF and the second adhesive layer AD2. Thus, the thin-film glass TG may be prevented from being damaged with external contaminants and foreign material.

FIGS. 9 to 12 are diagrams schematic showing a method for manufacturing the protective film module PM according to an embodiment of the disclosure.

Figure 9:
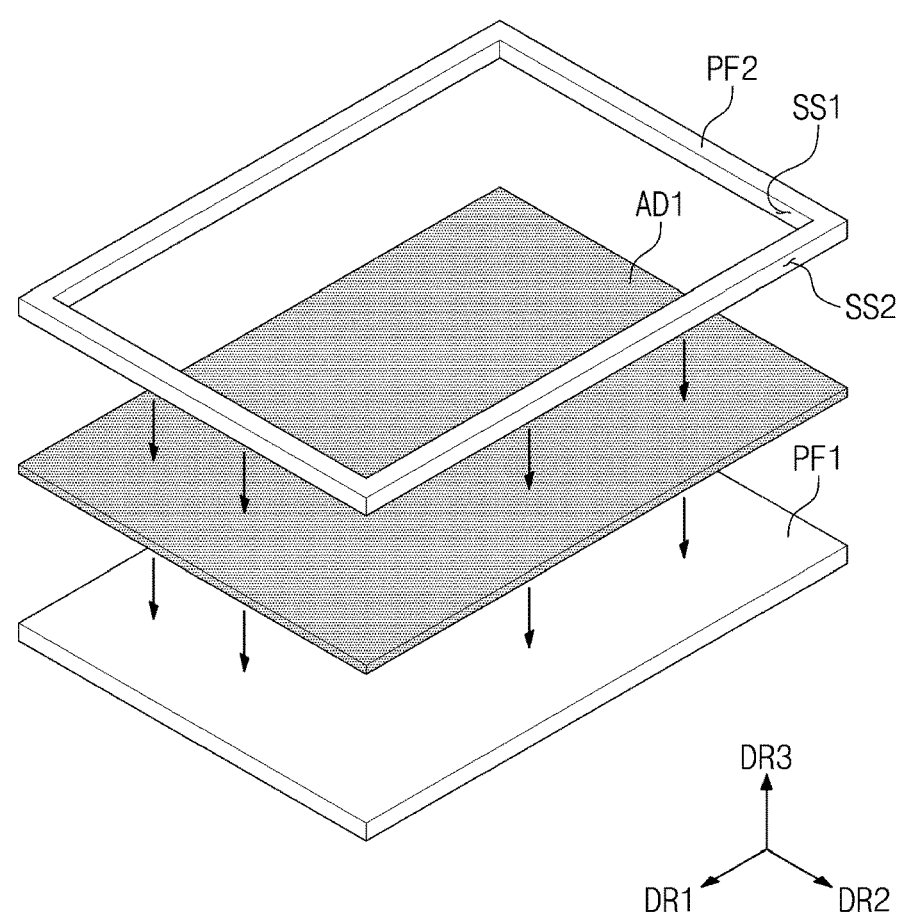
FIGS. 9 to 12 are schematic diagrams showing a method for manufacturing a protective film module according to an embodiment of the disclosure.

Referring to FIG. 9, the first adhesive layer AD1 may be bonded on the first film PF1, and the second film PF2 may be bonded to an outer portion of the first adhesive layer AD1. Outermost edges of the first film PF1, the first adhesive layer AD1, and the second film PF2 may correspond to each other, and the first film PF1, the first adhesive layer AD1, and the second film PF2 may be combined with each other. Thus, the side faces of the first film PF1, the first adhesive layer AD1, and the second film PF2 may be aligned with each other.

Figure 10:
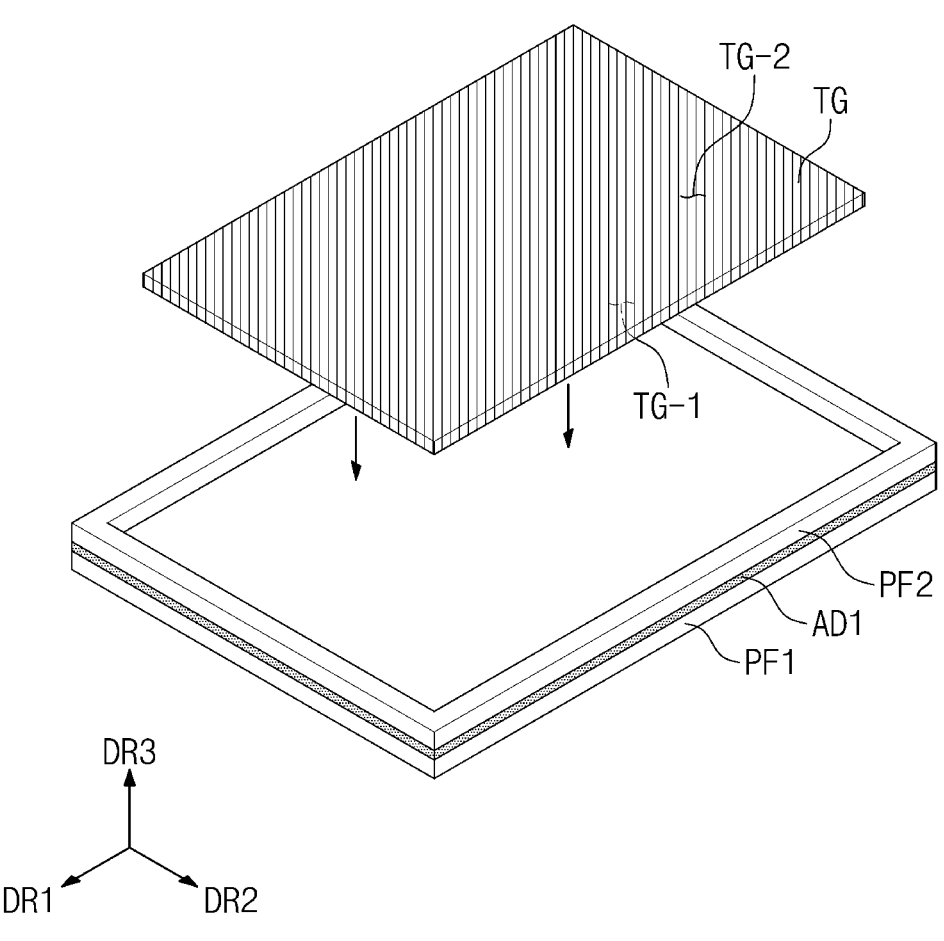

Referring to FIG. 10, the thin-film glass TG may be detachably bonded on the first adhesive layer AD1. Position of the thin-film glass TG may be adjusted and minimum distances between side faces (e.g., opposing side faces) of the thin-film glass TG and inner side faces (e.g., opposing inner side faces) of the second film PF2 adjacent thereto may be equal to each other.

Figure 11:
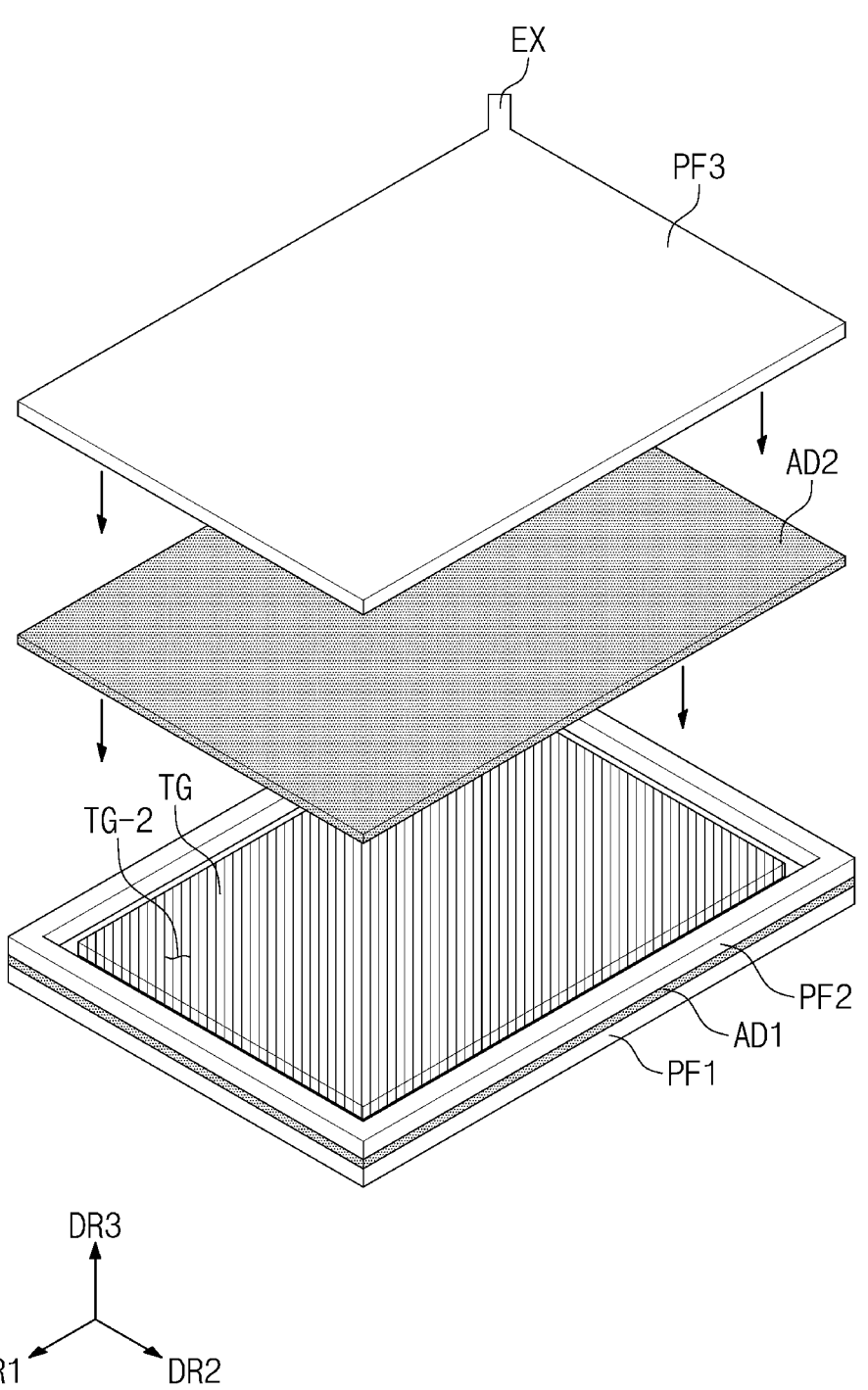

Referring to FIG. 11, after the second adhesive layer AD2 is bonded to the second film PF2, the third film PF3 may be bonded to the second adhesive layer AD2. The second adhesive layer AD2 and the third film PF3 may cover the second face TG-2 of the thin-film glass TG and protect the second face TG-2 of the thin-film glass TG.

Referring to FIG. 12, the third film PF3 may be pressed with the roller RR. A length of the roller RR in the second direction DR2 may be larger than a length of the third film PF3 in the second direction DR2. Ends (e.g., both opposing ends) of the roller RR may be respectively located outwardly of outer side faces (e.g., opposing outer side faces) of the third film PF3 adjacent thereto. The roller RR may move in the first direction DR1, and the roller RR may apply a pressure to a top face of the third film PF3.

Figure 13:
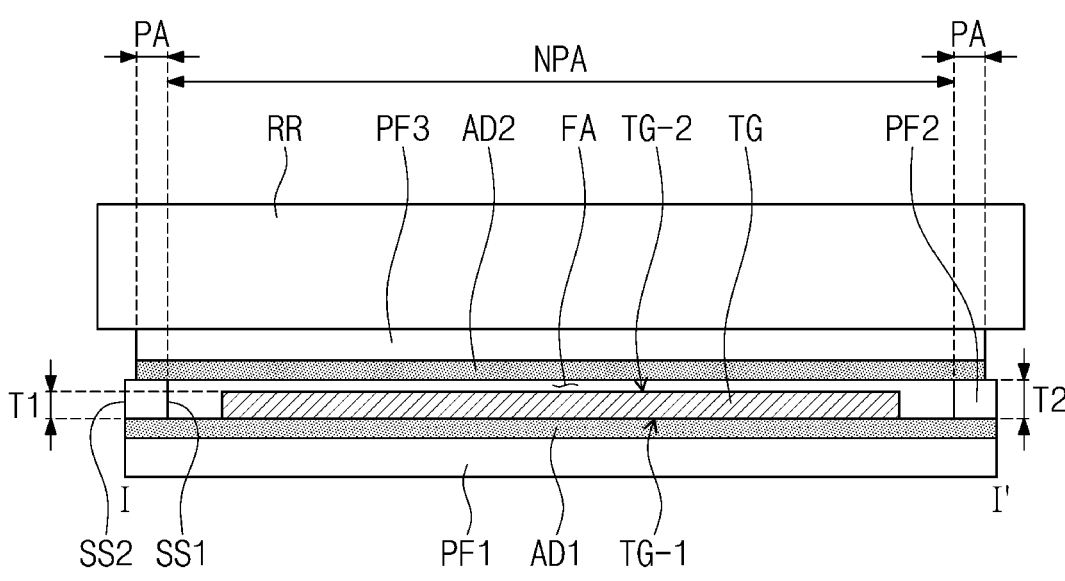
FIG. 13 is a schematic cross-sectional view of a protective film module and a roller according to an embodiment of the disclosure.
Figure 13:
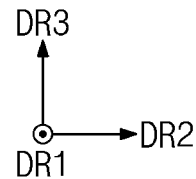

FIG. 13 is a schematic cross-sectional view of the protective film module PM and the roller RR according to an embodiment of the disclosure.

Referring to FIG. 13, in case that the third film PF3 is pressed with the roller RR, the pressure of the roller RR may be applied to the first adhesive layer AD1, the second adhesive layer AD2, the first film PF1, and the second film PF2 through a pressing area PA of the third film PF3 overlapping the second film PF2 in a plan view. The pressure of the roller RR may be transmitted through the pressing area PA, such that the pressure of the roller RR is not transmitted to the thin-film glass TG located in a non-pressing area NPA.

Accordingly, defects of the thin-film glass TG as caused by the pressure of the roller RR may be minimized. The defect in the thin-film glass TG may be minimized such that a possibility that a crack occurs due to the defect in case that the thin-film glass TG used in a foldable, rollable, or sliderable display folds, rolls, or slides may be reduced.

The thickness T2 of the second film PF2 may be in a range of about 1.3 to about 1.7 times of the thickness T1 of the thin-film glass TG. Even in case that the second film PF2 is compressed by pressing the roller RR on the third film PF3, the compressed thickness, which is compressed from the thickness T2, of the compressed second film PF2 may be greater than the thickness T1 of the thin-film glass TG. Thus, throughout an entire process of pressurization using the roller RR, the second face TG-2 of the thin-film glass TG may be positioned away from (or may be spaced apart from) the second adhesive layer AD2. Thus, the thin-film glass TG may not be pressurized by the roller RR.

According to the foregoing, the thin-film glass may be surrounded and protected with the films. The second film or the second base film portion may prevent the thin-film glass from being pressed by the roller.

Since the adhesive layer is not adhered to a face of the thin-film glass, transfer (or pollution) of the adhesive material thereto may be prevented.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A protective film module comprising:
a first film protecting a first face of a thin-film glass;
a first adhesive layer disposed between the thin-film glass and the first film and contacting the first face of the thin-film glass;
a second film disposed on the first adhesive layer, and covering the thin-film glass, and having a closed line shape in a plan view;
a third film protecting a second face opposite to the first face of the thin-film glass; and
a second adhesive layer disposed between the thin-film glass and the third film and in contact with the second film,
wherein the thin-film glass is disposed in an inner space defined between the second film, the first adhesive layer, and the second adhesive layer.

2. The protective film module of claim 1, wherein a thickness of the second film is in a range of about 1.3 to about 1.7 times of a thickness of the thin-film glass.

3. The protective film module of claim 1, wherein a side face of the thin-film glass is spaced, by a distance, from an inner side face of the second film adjacent to the side face of the thin-film glass.

4. The protective film module of claim 1, wherein the first adhesive layer is in contact with the first film.

5. The protective film module of claim 1, wherein corresponding side faces of the first film, the first adhesive layer, and the second film are aligned with each other.

6. The protective film module of claim 1, wherein an outer side face of the second film protrudes outwardly beyond an outer side face of the second adhesive layer.

7. The protective film module of claim 1, wherein the second face of the thin-film glass is spaced apart from second adhesive layer by a distance.

8. The protective film module of claim 1, wherein corresponding side faces of the second adhesive layer and the third film are aligned with each other.

9. The protective film module of claim 1, wherein a face of the second adhesive layer facing the second face of the thin-film glass is adhered only to a face of the second film adjacent to the second adhesive layer.

10. The protective film module of claim 1, wherein the second film is detachably bonded to the second adhesive layer.

11. The protective film module of claim 1, further comprising:
at least one pad disposed between the second adhesive layer and the thin-film glass and having a thickness smaller than a minimum distance between the second face of the thin-film glass and the second adhesive layer.

12. A method for manufacturing a protective film module, the method comprising:
bonding a first adhesive layer onto a first film;
bonding a second film to an outer portion of the first adhesive layer;
detachably bonding a thin-film glass onto the first adhesive layer;
bonding a second adhesive layer onto the second film;
bonding a third film onto the second adhesive layer; and
pressing the third film with a roller, wherein
the first film protects a first face of the thin-film glass, the first adhesive layer is disposed between the thin-film glass and the first film and contacts the first face of the thin-film glass, the second film is disposed on the first adhesive layer, surrounds the thin-film glass, and has a closed line shape in a plan view, the third film protects a second face opposite to the first face of the thin-film glass, the second adhesive layer is disposed between the thin-film glass and the third film, and the thin-film glass is disposed in an inner space defined between the second film, the first adhesive layer, and the second adhesive layer.

13. The method of claim 12, wherein in case that the third film is pressed with the roller, a pressure of the roller is transmitted to the first adhesive layer, the second adhesive layer, the first film, and the second film through a pressing area of the third film overlapping the second film in a plan view.

14. The method of claim 12, wherein in case that the third film is pressed with the roller, the second film is compressed, and a thickness of the compressed second film is greater than a thickness of the thin-film glass.

15. The method of claim 12, wherein in the pressing of the third film with the roller, the second face of the thin-film glass is spaced apart from the second adhesive layer.

16. The method of claim 12, wherein a thickness of the second film is in a range of about 1.3 to about 1.7 times of a thickness of the thin-film glass.

\* \* \* \* \*